United States Patent
Shionoya et al.

(10) Patent No.: US 12,034,143 B2
(45) Date of Patent: Jul. 9, 2024

(54) ELECTRODE FOR NON-AQUEOUS ELECTROLYTE SOLUTION SECONDARY BATTERY, METHOD OF PRODUCING ELECTRODE AND NON-AQUEOUS ELECTROLYTE SOLUTION SECONDARY BATTERY INCLUDING ELECTRODE

(71) Applicant: PRIME PLANET ENERGY & SOLUTIONS, INC., Tokyo (JP)

(72) Inventors: Haruka Shionoya, Toyota (JP); Katsushi Enokihara, Toyota (JP); Naohiro Mashimo, Toyota (JP); Masanori Kitayoshi, Toyota (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 71 days.

(21) Appl. No.: 17/678,510

(22) Filed: Feb. 23, 2022

(65) Prior Publication Data

US 2022/0293902 A1 Sep. 15, 2022

(30) Foreign Application Priority Data

Mar. 12, 2021 (JP) ................................. 2021-040445

(51) Int. Cl.
*H01M 4/04* (2006.01)
*H01M 10/0587* (2010.01)
*H01M 4/02* (2006.01)

(52) U.S. Cl.
CPC ....... *H01M 4/0435* (2013.01); *H01M 4/0404* (2013.01); *H01M 10/0587* (2013.01); *H01M 2004/025* (2013.01)

(58) Field of Classification Search
CPC .... H01M 4/04; H01M 4/0404; H01M 4/0435; H01M 4/30; H01M 10/0587
See application file for complete search history.

(56) References Cited

U.S. PATENT DOCUMENTS 6,444,357 B1 * 9/2002 Kambe .................. H01M 4/02
429/169
2010/0279158 A1 11/2010 Kumakari et al.

FOREIGN PATENT DOCUMENTS

JP 2002-015764 A 1/2002
JP 2014-199738 A 10/2014
(Continued)

OTHER PUBLICATIONS

Machine Translation of: JP 2002/015764, Aihara et al., Jan. 18, 2002.*

*Primary Examiner* — Kenneth J Douyette

(74) *Attorney, Agent, or Firm* — Finnegan, Henderson, Farabow, Garrett & Dunner, LLP

(57) ABSTRACT

An electrode disclosed here includes a surface part of an electrode active material layer has a plurality of first grooves extending in a width direction of the electrode current collector and at least one second groove extending in a longitudinal direction of an electrode current collector. The first groove is formed to be continuous from one end to another end. Here, a region in which the first groove and the second groove are formed is uniformly divided into three layers, which are an upper layer, an intermediate layer and a lower layer, in a thickness direction from the surface of the electrode active material layer to the electrode current collector, and when electrode densities (g/cm³) of the upper layer, the intermediate layer and the lower layer of the groove are $d_1$, $d_2$, and $d_3$, respectively, a relationship of $0.8 < (d_1/d_3) < 1.1$ is satisfied.

3 Claims, 7 Drawing Sheets

(56) References Cited

FOREIGN PATENT DOCUMENTS

| | | |
|---|---|---|
| JP | 2015-138619 A | 7/2015 |
| JP | 2016-076296 A | 5/2016 |

* cited by examiner

ELECTRODE FOR NON-AQUEOUS ELECTROLYTE SOLUTION SECONDARY BATTERY, METHOD OF PRODUCING ELECTRODE AND NON-AQUEOUS ELECTROLYTE SOLUTION SECONDARY BATTERY INCLUDING ELECTRODE

CROSS REFERENCE TO RELATED APPLICATIONS

Priority is claimed on Japanese Patent Application No. 2021-040445, filed Mar. 12, 2021, the content of which is incorporated herein by reference.

BACKGROUND OF THE DISCLOSURE

1. Technical Field

The present disclosure relates to an electrode for a non-aqueous electrolyte solution secondary battery, a method of producing the electrode, and a non-aqueous electrolyte solution secondary battery including the electrode.

2. Description of Background

Secondary batteries such as lithium ion secondary batteries are lighter in weight and have a higher energy density than conventional batteries, and thus are suitably used as high-output power supplies for mounting on vehicles or power supplies for computers and mobile terminals. As a typical structure of a positive electrode and a negative electrode (hereinafter simply referred to as an "electrode" when positive and negative electrodes are not particularly distinguished) included in this type of secondary battery, one in which an electrode active material layer containing an electrode active material as a main component is formed on one surface or both surfaces of a foil-like electrode current collector may be exemplified. Such an electrode active material layer is formed by applying a slurry (paste) electrode material prepared by dispersing solid components such as an electrode active material, a binding material (binder), and a conductive material in a predetermined solvent to a surface of a current collector to form a coating film, drying the coating film, and then applying a pressing pressure to obtain a predetermined density and thickness.

As one form of a secondary battery, a battery structure including a wound electrode body in which long sheet-shaped electrodes (a positive electrode and a negative electrode) are laminated with a separator therebetween and wound in a spiral shape is known. When the electrode body is made to have a spiral shape, a reaction area of the positive and negative electrodes can be increased, and accordingly, the energy density increases, and thus the output can be increased. In addition, in a secondary battery including a wound electrode body, in order to improve the adhesion between each of the positive and negative electrodes and the separator, a pressure is also applied from the outside. Thereby, it is possible to reduce the resistance of the secondary battery and prevent the electrodes and the separator from deviating from predetermined positions. On the other hand, since the gap between the electrode and the separator is narrowed, it is harder for the electrolyte solution to permeate therethrough, and the impregnation characteristics of the non-aqueous electrolyte solution with respect to the entire wound electrode body tend to be poor.

In order to address such a problem, Japanese Patent Application Publication No. 2002-15764 discloses a battery in which a plurality of grooves with at least one end that reaches an end of an electrode are formed on any active material layer of positive and negative electrodes, and thus a liquid injection speed and a degassing speed of an electrolyte solution can be improved. It is disclosed that formation of such grooves is performed by pressing the dried electrode active material layer with two flat plate molds having protrusions or two roll-shaped molds having protrusions.

SUMMARY

However, when grooves are formed by a conventional technique, the density of a region in the vicinity of the grooves locally increases (becomes dense) because the mold is pressed against the dried electrode active material layer. In addition, since the grooves are formed by scraping the surface of the electrode active material layer, the formed grooves become discontinuous (that is, they are not communicating) due to foreign substances generated in the procedure, and the capacity of the electrode decreases. While the densified groove functions as a path for injecting the electrolyte solution into the electrode, the surface of the groove is densified, and thus the impregnation characteristics of the electrolyte solution with respect to the entire electrode tend to be poor. In addition, it has been found that there is still room for improvement in the effect of increasing the electrolyte solution injection speed because the discontinuous groove blocks the electrolyte solution or air bubbles.

The present disclosure has been made in view of such circumstances, and a main object of the present disclosure is to provide an electrode having excellent impregnation characteristics of an electrolyte solution. In addition, another object is to provide a battery including the electrode and a method of producing the electrode.

In order to achieve the above object, an electrode for a non-aqueous electrolyte solution secondary battery is provided. The electrode disclosed here is any electrode of positive and negative electrodes, the electrode including a long sheet-shaped electrode current collector and an electrode active material layer formed on the electrode current collector, and a surface part of the electrode active material layer has a plurality of first grooves extending in a width direction of the electrode current collector and at least one second groove extending in a longitudinal direction of the electrode current collector. The first groove is formed to be continuous from one end to another end. Here, a region in which the first groove and the second groove are formed is uniformly divided into three layers, which are an upper layer, an intermediate layer and a lower layer, in a thickness direction from the surface of the electrode active material layer to the electrode current collector, and when electrode densities (g/cm$^3$) of the upper layer, the intermediate layer and the lower layer of the electrode active material layer are $d_1$, $d_2$, and $d_3$, respectively, a relationship of $0.8 < (d_1/d_3) < 1.1$ is satisfied.

With such a configuration, on the surface of the electrode active material layer, the first groove extending continuously from one end to the other end is formed in the width direction of the electrode current collector. The second groove extending in the longitudinal direction of the electrode current collector is formed to be orthogonal to the first groove. Thereby, the electrolyte solution injected through the first groove can be injected into the entire electrode through the second groove. In addition, since the region in which the first groove and the second groove are formed is not densified, the impregnation characteristics of the electrolyte solution with respect to the electrode are excellent. When such grooves are provided on the surface part of the electrode active material layer, it is possible to provide an electrode having excellent impregnation characteristics of the electrolyte solution.

In one preferable aspect of the electrode disclosed here, the second groove is formed in plurality in the longitudinal direction of the electrode current collector.

With such a configuration, the electrolyte solution injected through the first groove is easily injected into the entire electrode. Thereby, it is possible to provide an electrode in which the impregnation characteristics of the electrolyte solution are further improved.

In order to achieve the above other object, a non-aqueous electrolyte solution secondary battery is provided. The non-aqueous electrolyte solution secondary battery disclosed here includes a flat wound electrode body in which a positive electrode having a positive electrode active material layer on a long sheet-shaped positive electrode current collector, a negative electrode having a negative electrode active material layer on a long sheet-shaped negative electrode current collector, and a separator are wound around a winding axis, and a non-aqueous electrolyte solution, wherein the electrode described above is used as at least one of the positive electrode and the negative electrode.

With such a configuration, when the electrode having the above characteristics is provided, it is possible to provide a non-aqueous electrolyte solution secondary battery in which the impregnation characteristics of the electrolyte solution are improved, and battery characteristics are improved.

In order to achieve the above other object, there is provided a method of producing an electrode for a non-aqueous electrolyte solution secondary battery. The method of producing an electrode disclosed here is a method of producing an electrode including any electrode current collector of positive and negative electrodes and an electrode active material layer, the method including: a step in which a moisture powder formed of agglomerated particles containing at least an electrode active material, a binder resin, and a solvent is prepared, with a solid phase, a liquid phase, and a gas phase in at least 50 number % or more of the agglomerated particles forming a pendular state or a funicular state in the moisture powder; a step in which a coating film composed of the moisture powder is formed on the electrode current collector using the moisture powder when a gas phase of the coating film remains; a step in which the coating film on the electrode current collector is transported, concavo-convex transfer is performed using a first roll mold, and thus a plurality of first grooves extending in a direction orthogonal to a transport direction are formed on the coating film; a step in which concavo-convex transfer is performed on the coating film, in which the first grooves are formed, using a second roll mold, and thus at least one second groove extending in the transport direction is formed on the coating film; a step in which the coating film formed on the electrode current collector is dried to form an electrode active material layer; and a step in which the electrode active material layer is pressed. Here, in the electrode active material layer after the pressing step, the first groove is formed to be continuous from one end to the other end.

With such a configuration, it is possible to suitably produce an electrode having the above characteristics. When grooves are formed on the coating film formed when a gas phase remains before drying and pressing steps, a groove of a desired shape can be formed without densifying a region in the vicinity of the grooves. In addition, since the method does not include a step of processing the electrode active material layer after the drying step as in the related art, the capacity of the electrode is not reduced and foreign substances are not generated. Thereby, a continuous groove from one end to the other end can be formed.

In one preferable aspect of the method of producing an electrode disclosed here, in the moisture powder prepared in the step in which the moisture powder is prepared, when a bulk specific gravity measured by putting a moisture powder (g) into a container having a predetermined volume (mL) with leveling and without applying a force is set as a loose bulk specific gravity X (g/mL), and a specific gravity calculated from the composition of the moisture powder assuming that there is no gas phase is set as a true specific gravity Y (g/mL), a ratio: Y/X of the true specific gravity Y to the loose bulk specific gravity X is 1.2 or more.

With such a configuration, it is possible to more suitably produce a groove of a desired shape, which is a continuous groove from one end to the other end without densifying a region in the vicinity of the grooves.

In one preferable aspect of the method of producing an electrode disclosed here, in the second groove forming step, the second groove is formed in plurality in the transport direction.

With such a configuration, it is possible to suitably produce an electrode that further improves the impregnation characteristics of the electrolyte solution.

DETAILED DESCRIPTION

Hereinafter, preferable embodiments of a method of producing an electrode disclosed here will be described using an electrode suitably used for a lithium ion secondary battery, which is a typical example of a non-aqueous electrolyte solution secondary battery, as an example. Here, components other than those particularly mentioned in this specification that are necessary for implementation can be recognized by those skilled in the art as design matters based on the related art in the field. The method of producing an electrode disclosed here can be implemented based on content disclosed in this specification and common general technical knowledge in the field.

Here, the sizes (a length, a width, a thickness, etc.) do not reflect actual sizes.

In addition, the notation "A to B (where A and B are arbitrary values)" indicating a range in this specification means A or more and B or less.

In this specification, "non-aqueous electrolyte solution secondary battery" refers to a secondary battery in which a solvent constituting an electrolyte solution is mainly composed of a non-aqueous solvent (that is, an organic solvent). "Secondary battery" generally refers to a power storage device that can be repeatedly charged, and includes a so-called storage battery (that is, a chemical battery) such as a lithium ion secondary battery, a nickel metal hydride battery, and a nickel cadmium battery, as well as an electric double layer capacitor (that is, a physical battery). In addition, "lithium ion secondary battery" refers to a non-aqueous electrolyte solution secondary battery that uses lithium ions as a charge carrier and realizes charging/discharging by transferring charges associated with lithium ions between positive and negative electrodes. In this specification, when there is no need to particularly distinguish a positive electrode and a negative electrode, they are simply described as an electrode.

Figure 1:
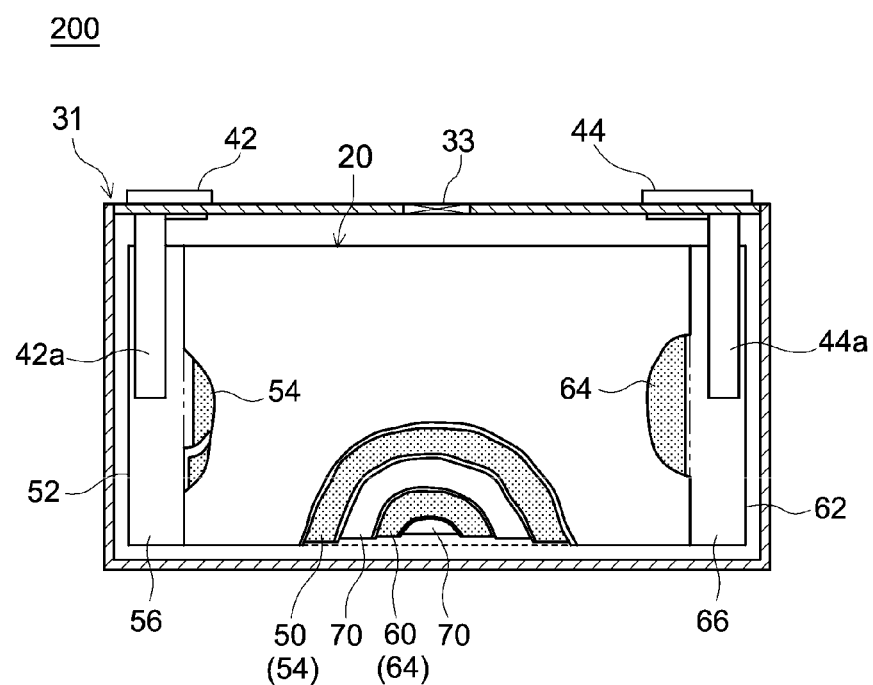
FIG. 1 is an illustrative diagram schematically showing a lithium ion secondary battery according to one embodiment.

A lithium ion secondary battery 200 shown in FIG. 1 is constructed by accommodating a flat wound electrode body 20 and a non-aqueous electrolyte solution (not shown) in a sealable box-shaped battery case 31. In the battery case 31, a positive electrode terminal 42 and a negative electrode terminal 44 for external connection, and a thin-walled safety valve 33 that is set, when an internal pressure of the battery case 31 increases to a predetermined level or more, to release the internal pressure are provided. In addition, an injection port (not shown) for injecting a non-aqueous electrolyte solution is provided in the battery case 31. The positive electrode terminal 42 and a positive electrode current collecting plate 42a are electrically connected. The negative electrode terminal 44 and a negative electrode current collecting plate 44a are electrically connected. The material of the battery case 31 is preferably a metal material having a high strength, lightweightness, and favorable thermal conductivity, and examples of such metal materials include aluminum and steel.

Figure 2:
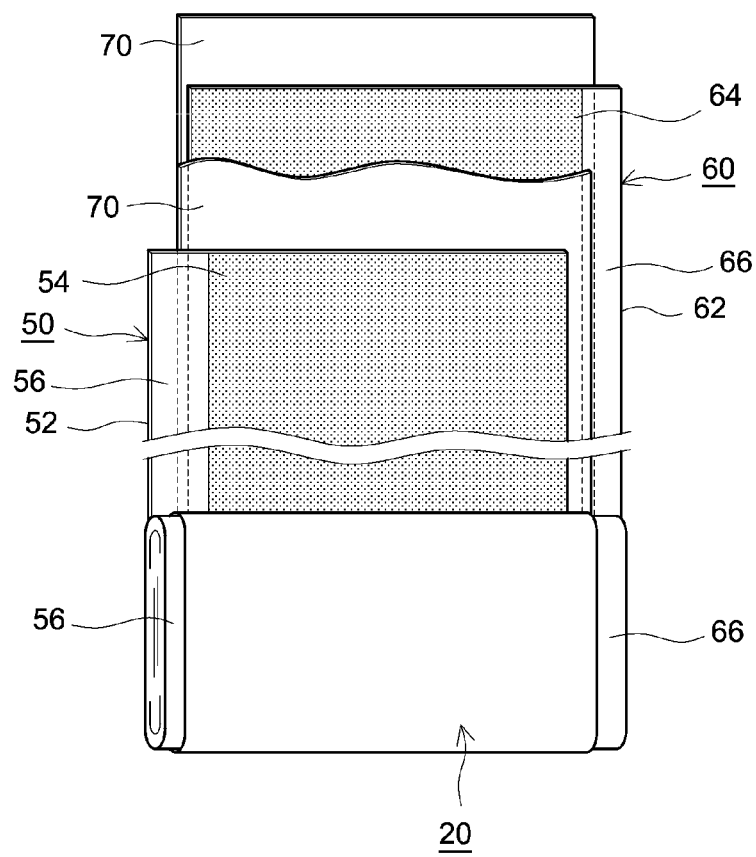
FIG. 2 is an illustrative diagram schematically showing a configuration of a wound electrode body of the lithium ion secondary battery according to one embodiment.
Figure 3:
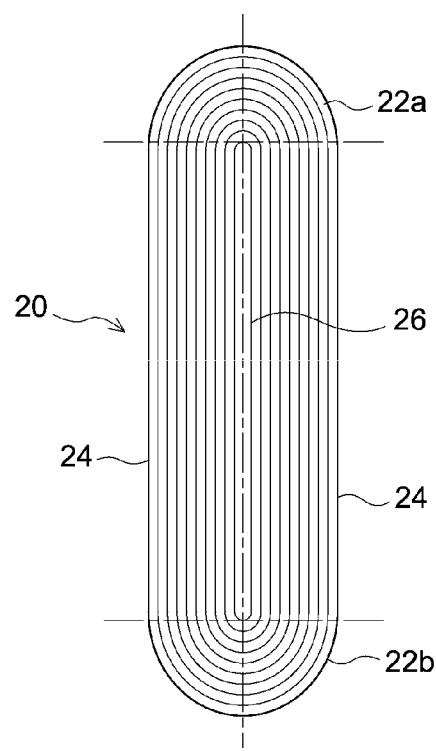
FIG. 3 is a diagram schematically showing a lateral cross section of the wound electrode body of the lithium ion secondary battery according to one embodiment.

As shown in FIG. 1 and FIG. 2, the wound electrode body 20 typically has a form in which a long sheet-shaped positive electrode (hereinafter referred to as a positive electrode sheet 50) and a long sheet-shaped negative electrode (hereinafter referred to as a negative electrode sheet 60) overlap with a long sheet-shaped separator 70 therebetween, and are wound in the longitudinal direction. The positive electrode sheet 50 has a configuration in which a positive electrode active material layer 54 is formed on one surface or both surfaces of a long sheet-shaped positive electrode current collector 52 in the longitudinal direction. The negative electrode sheet 60 has a configuration in which a negative electrode active material layer 64 is formed on one surface or both surfaces of a long sheet-shaped negative electrode current collector 62 in the longitudinal direction. As shown in FIG. 2 and FIG. 3, the wound electrode body 20 disclosed here is a flat wound electrode body including a pair of bent parts (curved part) 22a and 22b that face each other and two flat parts 24 that are continuously formed between the pair of bent parts.

The positive electrode current collecting plate 42a and the negative electrode current collecting plate 44a are bonded to a positive electrode current collector exposed part 56 (that is, a part in which the positive electrode active material layer 54 is not formed and the positive electrode current collector 52 is exposed) and a negative electrode current collector exposed part 66 (that is, a part in which the negative electrode active material layer 64 is not formed and the negative electrode current collector 62 is exposed) formed so that they protrude outward from both ends of the wound electrode body 20 in the winding axis direction.

Examples of the positive electrode current collector 52 include those of metal materials having favorable conductivity such as aluminum, nickel, titanium, and stainless steel. Among these, aluminum (for example, an aluminum foil) is particularly preferable.

Examples of positive electrode active materials contained in the positive electrode active material layer 54 include lithium transition metal composite oxides such as $LiN_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$, and lithium transition metal phosphate compounds such as $LiFePO_4$.

The positive electrode active material layer 54 may contain components other than the active material, for example, a conductive material and a binder. Regarding the conductive material, for example, carbon black such as acetylene black (AB) and other carbon materials (for example, graphite) can be suitably used. Regarding the binder, for example, polyvinylidene fluoride (PVDF) can be used.

The positive electrode active material is typically in the form of particles. The average particle size of the particulate positive electrode active material is not particularly limited, and is suitably 20 μm or less, and typically 1 μm to 20 μm. Here, in this specification, "average particle size" refers to a particle size ($D_{50}$, also referred to as a median diameter) corresponding to a cumulative frequency of 50 vol % from the fine particle end having a small particle size in a volume-based particle size distribution based on a general laser diffraction/light scattering method.

The negative electrode current collector 62 is made of, for example, a metal material having favorable conductivity such as copper, an alloy mainly composed of copper, nickel, titanium, or stainless steel. Among these, copper (for example, a copper foil) is particularly preferable.

Examples of negative electrode active materials contained in the negative electrode active material layer 64 include carbon materials such as graphite, hard carbon, and soft carbon. The negative electrode active material layer 64 may contain components other than the active material, for example, a binder and a thickener. Regarding the binder, for example, styrene butadiene rubber (SBR) may be used. Regarding the thickener, for example, carboxymethyl cellulose (CMC) may be used.

The negative electrode active material is typically in the form of particles. The average particle size of the particulate negative electrode active material is not particularly limited, and is suitably 50 μm or less, and typically 20 μm or less, for example, 1 μm to 20 μm.

In consideration of the energy density, for example, the content (that is, a proportion of the electrode active material with respect to a total mass of the electrode active material layer) of the electrode active material in the electrode active material layer 14 is preferably about 50 mass % or more, more preferably 80 mass % to 99 mass %, and still more preferably 85 mass % to 95 mass %. In addition, for example, the content of the binder in the electrode active material layer 14 is preferably 0.1 mass % to 15 mass % and more preferably 1 mass % to 10 mass %. In addition, when various additives such as a thickener are contained, for example, the content of the additive in the electrode active material layer 14 is preferably 7 mass % or less, and more preferably 5 mass % or less.

The average thickness (average film thickness) per one surface of the positive electrode active material layer 54 and the negative electrode active material layer 64 is not particularly limited, and may be 10 µm to 300 µm or less, for example, 20 µm to 150 µm or less. The thickness of the positive electrode current collector 52 and the negative electrode current collector 62 may be, for example, about 5 µm to 20 µm, and is preferably 8 µm to 15 µm.

Regarding the separator 70, for example, a porous sheet (film) made of a resin such as polyethylene (PE), polypropylene (PP), polyester, cellulose, and polyamide may be exemplified. Such a porous sheet may have a single-layer structure, or a laminate structure of two or more layers (for example, a three-layer structure in which a PP layer is laminated on both surfaces of a PE layer). In the separator 70, a heat resistant layer (HRL) may be provided.

Figure 4:
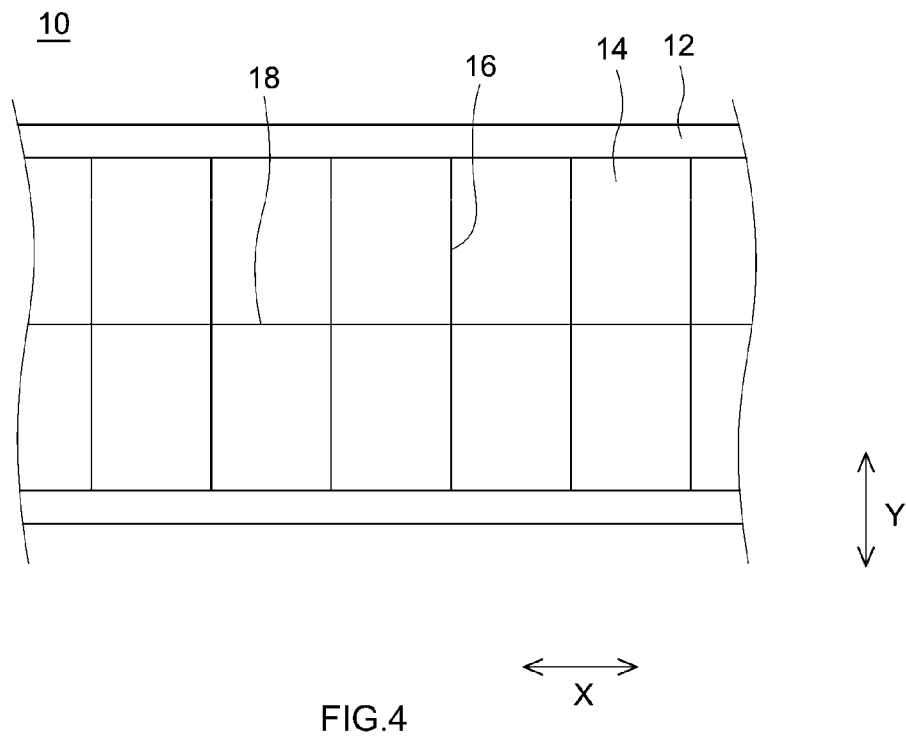
FIG. 4 is a plan view schematically showing an electrode according to one embodiment.
Figure 5:
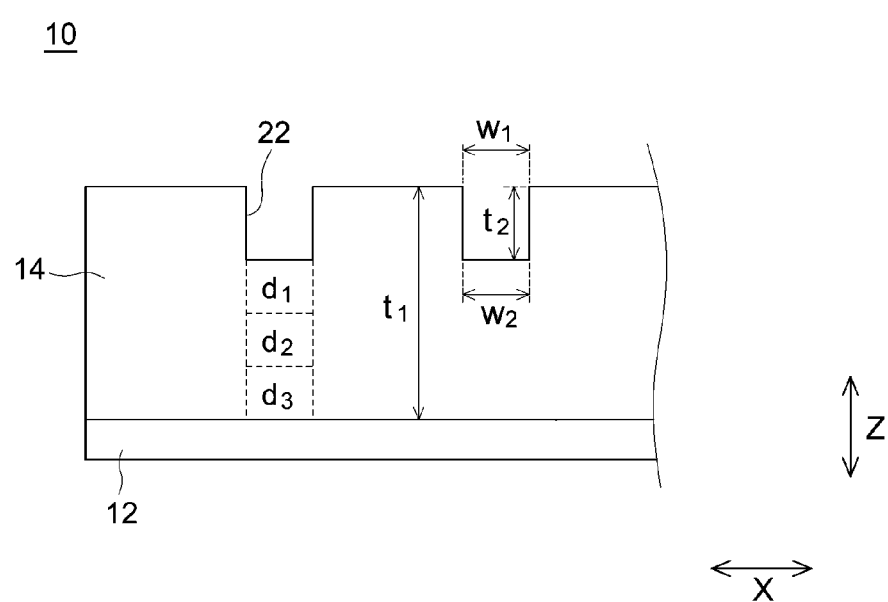
FIG. 5 is a diagram schematically illustrating the electrode according to one embodiment.

FIG. 4 is a plan view schematically showing an electrode disclosed here, and FIG. 5 is a diagram schematically illustrating the electrode. In FIG. 4 reference sign X indicates a longitudinal direction of the electrode and a reference sign Y indicates a width direction of the electrode. In FIG. 5 reference sign X indicates a longitudinal direction of the electrode and a reference sign Z indicates a thickness direction of the electrode. An electrode 10 includes an electrode current collector 12 and the electrode active material layer 14 formed on the electrode current collector 12. As shown in FIG. 4, the electrode 10 disclosed here includes a first groove 16 extending in a width direction (Y direction) of the electrode current collector 12 and a second groove 18 extending in the longitudinal direction (X direction) on the surface of the electrode active material layer 14.

A plurality of first grooves 16 are formed so that they are continuous from one end to the other end in the width direction (Y direction). In consideration of the effect of an electrolyte solution injection path, when the wound electrode body 20 is constructed, preferably, at least one first groove 16 is formed on each flat part 24. The first grooves 16 may be formed with certain intervals (pitch) or may be formed with different intervals (pitch). When the first grooves 16 are formed with different intervals, for example, since the winding start side has a shorter circumference than the winding end side when the wound electrode body 20 is constructed, in consideration of this point, in a part corresponding to the winding start side of the wound electrode body 20, the interval between the first grooves 16 may be narrowed (that is, the number of first grooves 16 formed is large), and the interval may be widened toward the winding end side (that is, the number of first grooves 16 formed is small). In this manner, the wound electrode body 20 into which an electrolyte solution is suitably injected can be constructed by adjusting the interval of the first grooves 16.

When the average film thickness of the electrode active material layer 14 is $t_1$ (µm), and the depth of the groove is $t_2$ (µm), the first groove 16 preferably has a groove depth $t_2$ that is 15% or more (for example, 15% to 95%, typically 20% to 80%) of the average film thickness $t_1$. Here, the average film thickness of the electrode active material layer is an average film thickness of a part in which no grooves are formed on the electrode active material layer.

In addition, it is preferable to set the groove depth $t_2$ (µm) such that the groove remains even when the wound electrode body 20 is constructed by winding the electrode 10. Although it is not particularly limited because it varies depending on the wound electrode body 20 to be produced, it is more preferable that the groove depth $t_2$ (µm) be set so that the groove remains even when a predetermined constraint load a (N) is applied from both sides of the wide surface of the battery case 31 if the wound electrode body 20 is configured and accommodated in the lithium ion secondary battery 200. For example, when the constraint load a (N) is applied, the depth $t_2$ (µm) of the groove present in the electrode active material layer 14 and the thickness d (µm) of the separator 70 change. The groove depth Δt when the constraint load a (N) is applied is a value calculated from a Young's modulus G of the electrode active material layer 14, the groove depth $t_2$ (µm) before the constraint load a (N) is applied, and the constraint load a (N), and represented by $\Delta t_2=(\sigma t_2/G)$. In addition, the thickness Δd of the separator when the constraint load a (N) is applied is a value calculated from Young's modulus E of the separator 70, the thickness d before the constraint load a (N) is applied, and the constraint load σ (N), and is represented by $\Delta d=(\sigma d/E)$. In this case, if the groove depth $t_2$ (µm) is larger than $(\Delta t_2+\Delta d)$, the groove remains. Therefore, the groove depth $t_2$ (µm) that satisfies $t_2>(\Delta t_2+\Delta d)$ is preferable. That is the groove depth $t_2$ (µm) that satisfies $t_2>(G\sigma d/E(G-\sigma))$ is preferable.

In the first groove 16, when the groove width of the opening is $w_1$ (µm) and the groove width of the bottom is $w_2$ (µm), the groove width $w_1$ of the opening and the groove width $w_2$ of the bottom may have the same length or different lengths. The groove width $w_1$ of the opening and the groove width $w_2$ of the bottom are not particularly limited, and may be 40 µm or more and 250 µm or less or 50 µm or more and 200 µm or less.

Figure 6A:
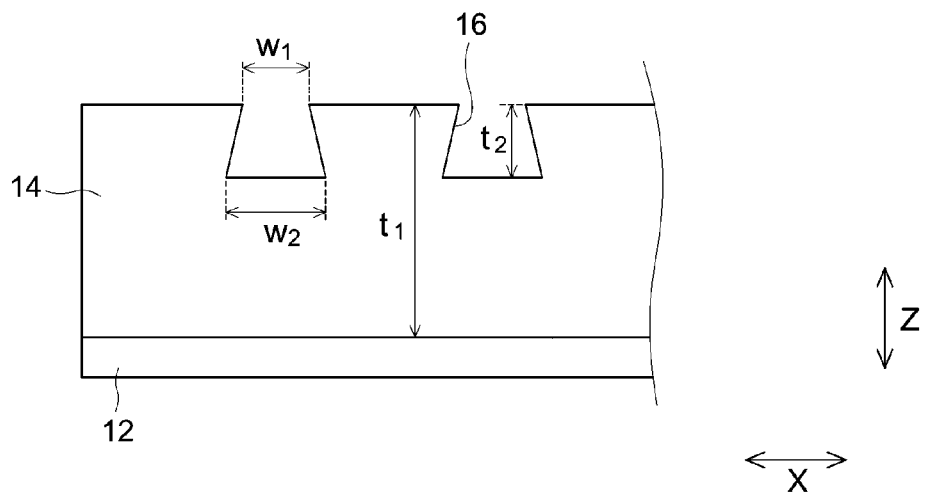
FIG. 6A is a diagram schematically showing an example of a cross-sectional shape of a groove of the electrode according to one embodiment.
Figure 6B:
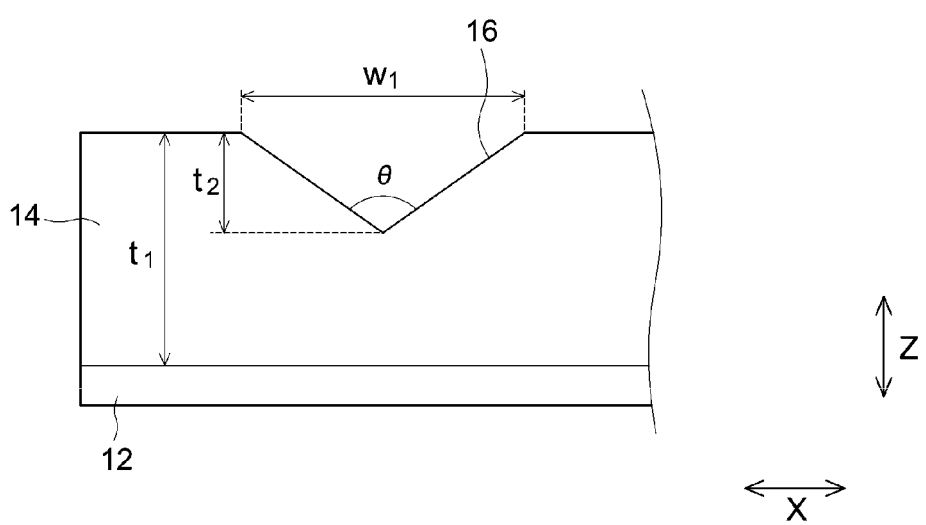
FIG. 6B is a diagram schematically showing another example of the cross-sectional shape of the groove of the electrode according to one embodiment.

The cross-sectional shape of the first groove 16 is preferably a cross-sectional shape in which the groove remains in the curved parts 22a and 22b of the wound electrode body 20. More suitably, a cross-sectional shape in which the groove remains in the curved parts 22a and 22b from a start of winding of the wound electrode body 20 to one revolution (hereinafter referred to as an innermost circumferential part 26) is preferable. In FIG. 6A and FIG. 6B references sign X indicates a longitudinal direction of the electrode and a reference sign Z indicates a thickness direction of the electrode. FIG. 6A and FIG. 6B are diagrams schematically showing a cross-sectional shape of the groove. As shown in FIG. 5, and FIG. 6A and FIG. 6B, in the cross-sectional shape of the first groove 16 formed in the electrode active material layer 14, the groove width $w_1$ of the opening and the groove width $w_2$ of the bottom may be substantially the same (for example, a rectangular shape), the groove width $w_1$ of the opening and the groove width $w_2$ of the bottom may be different (for example, a trapezoidal shape), and the groove width $w_2$ of the bottom may be 0 µm (for example, an inverted triangular shape). In addition, when the cross-sectional shape is an inverted triangular shape, it is preferably formed so that the angle θ is 90 degrees or more. Here, the cross-sectional shape does not have to be composed of only straight lines, and may be, for example, a rounded cross-sectional shape (for example, a semicircular shape).

Figure 7:
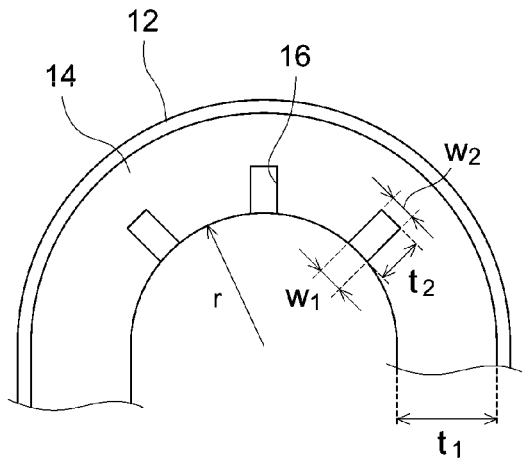
FIG. 7 is a diagram schematically illustrating a state in which the electrode according to one embodiment is constructed as a wound electrode body.

Regarding the cross-sectional shape of the groove, as described above, when the wound electrode body 20 is constructed, it is preferable that the groove be present in the curved parts 22a and 22b. FIG. 7 is a diagram illustrating a schematic description of the innermost circumferential part 26 of the wound electrode body 20 when the electrode 10 is constructed as the wound electrode body 20. In the curved part from a start of winding of the wound electrode body 20 to the first revolution, when the radius of the inner circumference is r, and the radius of the outer circumference is $(r+t_1)$, the circumference of the inner circumference of the curved part is $\pi r$, and the circumference of the outer circumference is $\pi(r+t_1)$. The circumference difference between the circumference $\pi r$ of the inner circumference and the circumference $\pi(r+t_1)$ of the outer circumference is represented by $\pi t_1$. When n grooves are present in the curved part, the groove width $w_1$ of each groove shrinks by $(\pi t_1/n)$. In addition, similarly, in the groove width $w_2$ of the bottom, the circumference difference from the circumference $\pi(r+t_1)$ of the outer circumference is represented by $\pi(t_1-t_2)$, and the groove width $w_2$ of each groove shrinks by $(\pi(t_1-t_2)/n)$. Therefore, the cross-sectional shape of the first groove 16 may be any cross-sectional shape that satisfies a relationship of $w_1>(\pi t_1/n)$ and/or $w_2>(\pi(t_1-t_2)/n)$.

As shown in FIG. 6A, in the case of the cross-sectional shape of the groove that satisfies $w_1<w_2$, when winding is performed as shown in FIG. 7, the opening side may be completely closed (that is, $w_1=0$), and only the space on the bottom side may remain. In such a case, if there is a space in which a non-aqueous electrolyte solution can be injected, it functions as an injection path. That is, when the wound electrode body 20 is produced, the groove may have a cross-sectional shape so that the opening is closed (that is, $w_1=0$).

At least one second groove 18 extending in the longitudinal direction (X direction) of the electrode current collector 12 may be present on the surface part of the electrode active material layer 14. The second groove 18 may be present in the central part or at the end of the current collector in the width direction (Y direction). In order to shorten a liquid injection time, one groove is preferably present in the central part in which it is more difficult for a non-aqueous electrolyte solution to permeate. When at least one second groove 18 is formed, a speed at which the non-aqueous electrolyte solution permeating through the first groove 16 permeates the entire electrode 10 is faster, and the impregnation characteristics of the electrode 10 are improved.

A plurality of second grooves 18 may be present. When a plurality of second grooves 18 are present, they may be formed with certain intervals (pitch) or may be formed with different intervals (pitch). When grooves are formed with different pitches, for example, they may be formed so that more grooves are present at the end than the central part of the electrode 10 in the width direction.

In order to improve the impregnation characteristics of the electrolyte solution and shorten the liquid injection time, the size of the second groove 18 may be appropriately set, and is not particularly limited. The groove depth $t_3$ (μm) of the second groove 18 is, for example, preferably a groove depth $t_3$ that is 1% or more (for example, 1% to 70%, typically 5% to 40%) of the average film thickness $t_1$. As described above, as in the first groove 16, the cross-sectional shape of the groove may be a rectangular shape, a trapezoidal shape, an inverted triangular shape, or a semicircular shape. The groove width is not particularly limited, and may be 40 μm or more and 250 μm or less, or 50 μm or more and 200 μm or less.

Here, an upper layer, an intermediate layer and a lower layer in this specification will be described with reference to FIG. 5. Here, a region in which the first groove 16 is formed will be described, but the same applies to the region in which the second groove 18 is formed. In the region in which the first groove 16 is formed, the electrode active material layer 14 is uniformly divided into three layers, an upper layer, an intermediate layer and a lower layer. The lower layer, the intermediate layer, and the upper layer are positioned in this order in the thickness direction (Z direction) from the interface between the electrode active material layer 14 and the electrode current collector 12. For example, the lower layer is a position about 33% into the thickness of the electrode active material layer 14 from the interface between the electrode active material layer 14 and the electrode current collector 12 in the thickness direction (Z direction). Similarly, the intermediate layer and the upper layer are positions at which the thickness of the electrode active material layer 14 is divided into three equal parts. In addition, the electrode densities (g/cm$^3$) of the upper layer, the intermediate layer and the lower layer in the region in which the first groove 16 is formed are $d_1$, $d_2$, and $d_3$, respectively. Here, as shown, in this specification, the "region in which grooves are formed" is a region in which a line is drawn virtually perpendicular to the thickness direction (Z direction) of the electrode active material layer 14 from both ends of the width $w_1$ of the opening and the width $w_2$ of the bottom when the width $w_1$ of the opening and the width $w_2$ of the bottom have the same length. The region is a region in which a line is drawn virtually perpendicular to the thickness direction (Z direction) of the electrode active material layer 14 from both ends of the width $w_1$ of the opening and the width $w_2$ of the bottom, whichever is longer, when the width $w_1$ of the opening and the width $w_2$ of the bottom, have different lengths.

In addition, the electrode densities of the upper layer, the intermediate layer and the lower layer can be obtained, for example, by multiplying the true density of the electrode by a filling rate in the corresponding range (that is, any of the upper layer, the intermediate layer and the lower layer). The true density of the electrode is, for example, a value calculated based on the density and proportional content of constituent components. The filling rate in the corresponding range can be calculated, for example, by performing binarization processing in cross section observation of the electrode active material layer using a scanning electron microscope (SEM). Specifically, the cross-section image is subjected to binarization processing so that the solid phase part present in the corresponding range turns white and the gas phase (void) part turns black using image analysis software "ImageJ" which is an open source and well-known as public domain image processing software. Thereby, it can be calculated from "S1/(S1+S2)×100" when the area of the part (white part) in which the solid phase is present is called S1, and the area of the void part (black part) is called S2.

In the electrode 10 disclosed here, the electrode densities of the upper layer and the lower layer of the region in which grooves are formed have a relationship of $0.8<(d_1/d_3)<1.1$. The electrode densities of the upper layer and the lower layer of the region in which grooves are formed more preferably have a relationship of $0.9<(d_1/d_3)<1.08$, and still more preferably have a relationship of $0.95<(d_1/d_3)<1.08$. When there is no difference in the electrode density between the upper layer and the lower layer, the value of $(d_1/d_3)$ is 1. That is, in the electrode 10 disclosed here, even though grooves are formed, the difference in the electrode density between the upper layer and the lower layer of the groove is small (that is, the $(d_1/d_3)$ is close to 1). The electrode 10 can be favorably realized using a gas-phase-controlled moisture powder to be described below. Although not particularly limited, when grooves are formed in the coating film state having an appropriate solvent (liquid phase) and a gas phase, it is possible to move the active material (solid phase) to the part in which the gas phase is slightly reduced and minimize densification (local increase in density).

With such a configuration, since the formed groove is not densified, it is possible to more suitably improve the impregnation characteristics of the electrode 10.

Regarding the non-aqueous electrolyte solution, those used in the conventional lithium ion secondary battery can be used, and typically an organic solvent (non-aqueous solvent) containing a supporting salt can be used. Regarding the non-aqueous solvent, organic solvents such as carbonates, esters, ethers, nitriles, sulfones, and lactones can be used without particular limitation. Specifically, for example, non-aqueous solvents such as ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyldifluoromethyl carbonate (F-DMC), and trifluorodimethyl carbonate (TFDMC) can be suitably used. These non-aqueous solvents may be used alone or two or more thereof may be appropriately used in combination. Regarding the supporting salt, for example, a lithium salt such as $LiPF_6$, $LiBF_4$, and $LiClO_4$ can be suitably used. The concentration of the supporting salt is not particularly limited, and is preferably about 0.7 mol/L or more and 1.3 mol/L or less.

Here, as long as the effects of the present disclosure are not significantly impaired, the non-aqueous electrolyte solution may contain components other than the above non-aqueous solvent and supporting salt, for example, various additives such as a gas generating agent, a film forming agent, a dispersant, and a thickener.

Method of Producing Electrode

Figure 8:
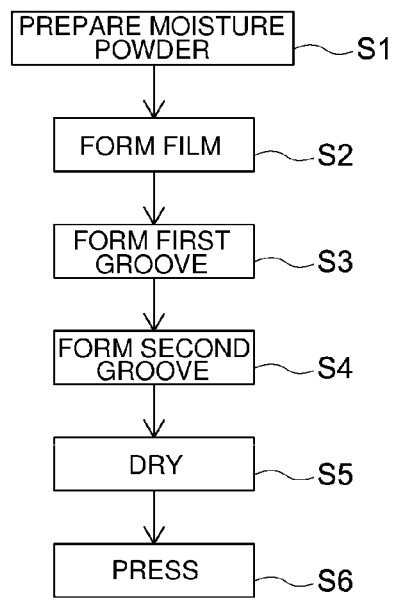
FIG. 8 is a flowchart showing a rough operation of a method of producing an electrode according to one embodiment.

As shown in FIG. 8, roughly speaking, a method of producing an electrode disclosed here includes the following 6 steps: (1) a step in which a moisture powder (electrode material) is prepared (S1); (2) a step in which a coating film composed of the moisture powder is formed (S2); (3) a step in which a first groove is formed (S3); (4) a step in which a second groove is formed (S4); (5) a step in which the coating film is dried to form an electrode active material layer (S5); and (6) a step in which the electrode active material layer is pressed (S6), and is characterized in that the first groove and the second groove are formed on the coating film before the drying step. Therefore, other steps are not particularly limited, and may have the same configuration as this type of conventional production method. Hereinafter, the steps will be described.

Figure 9:
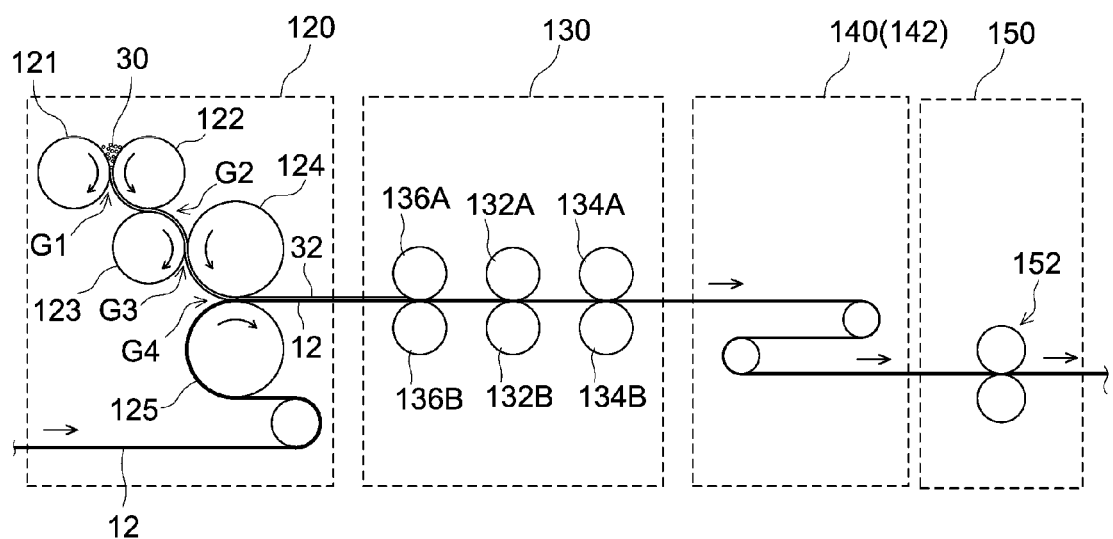
FIG. 9 is a block diagram schematically showing a configuration of an electrode production device according to one embodiment.

FIG. 9 is a block diagram schematically showing a schematic configuration of an electrode production device according to the method of producing an electrode disclosed here. An electrode production device 100 shown in FIG. 9 includes, typically, a film forming part 120 in which, while the sheet-shaped electrode current collector 12 that has been transported from a supply chamber (not shown) is transported in a longitudinal direction, a coating film 32 made of an electrode material 30 is formed on the surface of the electrode current collector 12, a coating film processing part 130 in which the first groove 16 and the second groove 18 are formed on the surface of the coating film 32, a drying part 140 in which the coating film 32 is appropriately dried to form the electrode active material layer 14, and a pressing part 150 in which the dried electrode active material layer 14 is pressed with an appropriate pressing pressure. These are disposed in order along a predetermined transport path.

Preparing Step

The electrode material 30 can be prepared by mixing solid materials such as the above electrode active material, a binder resin, and other additives, and a solvent using a conventionally known mixing device. The solid component (that is, solid material excluding the solvent) can be appropriately selected from the above materials. Examples of such a mixing device include a planetary mixer, a ball miller, a roll miller, a kneader, and a homogenizer.

The electrode material 30 can have the form of a paste, a slurry, or a granulated component, and the granulated component, particularly, a moisture granulated component (moisture powder) containing a small amount of a solvent, is suitable for forming an electrode active material layer on the electrode current collector 12 in the electrode production device 100 disclosed here. Here, in this specification, the moisture powder morphological classification is described in "Particle Size Enlargement" by Capes C. E. (published by Elsevier Scientific Publishing Company, 1980), four classifications that are currently well known are used in this specification, and the moisture powder disclosed here is clearly defined. Specifically, it is as follows.

The existence form (filled state) of a solid component (solid phase), a solvent (liquid phase) and voids (gas phase) in the agglomerated particles constituting a moisture powder can be classified into four states: "pendular state," "funicular state," "capillary state," and "slurry state."

Figure 10A:
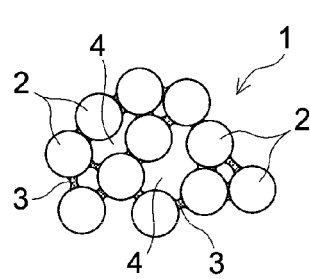
FIG. 10A to FIG. 10D show illustrative diagrams schematically showing existence forms of a solid phase (solid component such as active material particles), a liquid phase (solvent), and a gas phase (void) in agglomerated particles constituting a moisture powder, with FIG. 10A showing a pendular state, FIG. 10B showing a funicular state, FIG. 10C showing a capillary state, and FIG. 10D showing a slurry state.

Here, as shown in FIG. 10A, "pendular state" refers to a state in which a solvent (liquid phase) 3 is discontinuously present to crosslink active material particles (solid phase) 2 in an agglomerated particle 1, and the active material particles (solid phase) 2 may be present in a (continuous) state in which they are connected to each other. As shown, the content of the solvent 3 is relatively low, and as a result, most voids (gas phase) 4 present in the agglomerated particle 1 are continuously present and form communication holes that lead to the outside. In addition, one characteristic of the pendular state is that a continuous solvent layer is not observed over the entire outer surface of the agglomerated particle 1 in electron microscope observation (for example, scanning electron microscope (SEM) observation).

Figure 10B:
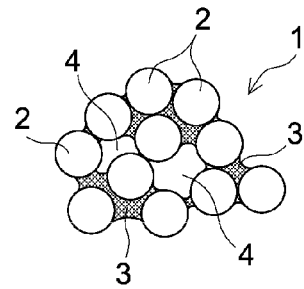

In addition, as shown in FIG. 10B, "funicular state" refers to a state in which the content of the solvent in the agglomerated particle 1 is relatively higher than that of a pendular state, and a state in which the solvents (liquid phase) 3 are continuously present around the active material particles (solid phase) 2 in the agglomerated particle 1. However, since the amount of the solvent is still small, as in the pendular state, the active material particles (solid phase) 2 are present in a (continuous) state in which they are connected to each other. On the other hand, among the voids (gas phase) 4 present in the agglomerated particle 1, the proportion of communication holes that lead to the outside decreases slightly, and the abundance proportion of the discontinuous isolated voids tends to increase, but the presence of communication holes is recognized.

The funicular state is a state between the pendular state and the capillary state, and in a funicular I state where the funicular state is divided into a funicular I state (that is, a state in which the amount of the solvent is relatively small) closer to the pendular state and a funicular II state (that is, a state in which the amount of the solvent is relatively large)

closer to the capillary state, it still includes a state in which no solvent layer is observed on the outer surface of the agglomerated particle 1 in electron microscope observation.

Figure 10C:
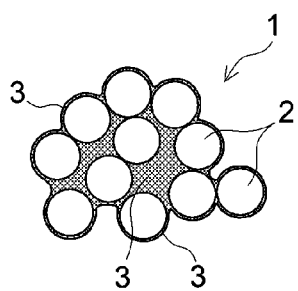

As shown in FIG. 10C, in the "capillary state," the content of the solvent in the agglomerated particle 1 increases, the amount of the solvent in the agglomerated particle 1 becomes close to a saturated state, a sufficient amount of the solvent 3 is continuously present around the active material particles 2, and as a result, the active material particles 2 are present in a discontinuous state. For voids (gas phase) present in the agglomerated particle 1, almost all voids (for example, 80 vol % of a total void volume) are present as isolated voids due to the increase in the amount of the solvent, and the abundance proportion of voids in the agglomerated particle 1 also becomes small.

Figure 10D:
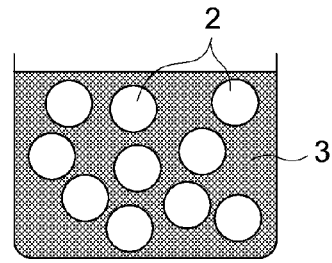

As shown in FIG. 10D, "slurry state" refers to a state in which the active material particles 2 have already been suspended in the solvent 3, and a state that cannot be called agglomerated particles. There is almost no gas phase.

In the related art, moisture powder sheeting in which a film is formed using a moisture powder is known, but in the conventional moisture powder sheeting, the moisture powder is in a so-called "capillary state" shown in FIG. 10C in which a liquid phase is continuously formed throughout the powder.

On the other hand, the moisture powder disclosed here is a moisture powder in which at least 50% or more of the agglomerated particles 1 form the pendular state or the funicular state (in particular, the funicular I state) (1). Preferably, the moisture powder has one morphological characteristic in which, when the gas phase is controlled, no layer formed of the solvent is observed over the entire outer surface of the agglomerated particles in electron microscope observation (2).

Hereinafter, the moisture powder disclosed here that satisfies the requirements (1) and (2) is referred to as a "gas-phase-controlled moisture powder."

Here, in the gas-phase-controlled moisture powder disclosed here, it is preferable that at least 50 number % or more of the agglomerated particles satisfy the requirements (1) and (2).

The gas-phase-controlled moisture powder can be produced according to a conventional process of producing a moisture powder in a capillary state. That is, when the amount of the solvent and the formulation of solid components (the active material particles, the binder resin, etc.) are adjusted so that the proportion of the gas phase is higher than in the related art, and specifically, many continuous voids (communication holes) that lead to the outside are formed in the agglomerated particles, it is possible to produce a moisture powder as an electrode material (electrode mixture) included in the pendular state or the funicular state (in particular, the funicular I state).

In addition, in order to realize a liquid crosslink between active materials with the smallest amount of the solvent, it is desirable that the surface of the powder material used and the solvent used have an appropriate affinity.

Preferably, examples of appropriate gas-phase-controlled moisture powders disclosed here include a moisture powder in which a three-phase state recognized in electron microscope observation is a pendular state or funicular state (in particular, the funicular I state) and "a ratio: Y/X of the true specific gravity Y to the loose bulk specific gravity X" calculated from a loose bulk specific gravity X (g/mL), which is an actually measured bulk specific gravity, measured by putting the obtained moisture powder into a container having a predetermined volume with leveling and without applying a force, and a raw-material-based true specific gravity Y (g/mL), which is a specific gravity calculated from the composition of the moisture powder assuming that there is no gas phase is 1.2 or more, preferably 1.4 or more (or 1.6 or more), and preferably 2 or less.

Wet granulation can be performed using the above materials to produce a desired moisture powder. Specifically, for example, respective materials are mixed using a stirring granulation machine (a mixer such as a planetary mixer) to produce a moisture powder (that is, an aggregate of agglomerated particles). This type of stirring granulation machine includes a mixing container that is typically cylindrical, a rotary blade accommodated in the mixing container, and a motor connected to the rotary blade (also referred to as a blade) via a rotating shaft.

In the preparing step S1, among the above materials, first, materials (solid components) excluding the solvent are mixed in advance to perform a solvent-less dry dispersion treatment. Therefore, a state in which respective solid components are highly dispersed is formed. Then, preferably, a solvent and other liquid components (for example, a liquid binder) are added to the dispersed mixture and additionally mixed. Accordingly, a moisture powder in which respective solid components are suitably mixed can be produced.

Specifically, an electrode active material which is a solid component and various additives (a binder resin, a thickener, a conductive material, etc.) are put into the mixing container of the stirring granulation machine, the motor is driven to rotate the rotary blade, for example, at a rotational speed of 2,000 rpm to 5,000 rpm for about 1 to 60 seconds (for example, 2 to 30 seconds), and thus a mixture of respective solid components is produced. Then, an appropriate amount of the solvent is weighed out so that the solid component is 70% or more, and more preferably 80% or more (for example, 85% to 98%), and is put into the mixing container, and a stirring granulation treatment is performed. Although not particularly limited, the rotary blade is additionally rotated, for example, at a rotational speed of 100 rpm to 1,000 rpm for about 1 to 60 seconds (for example, 2 to 30 seconds). Accordingly, respective materials and the solvent in the mixing container can be mixed to produce a moisture granulated component (moisture powder). Here, additionally, when stirring is intermittently performed at a rotational speed of about 1,000 rpm to 3,000 rpm for a short time of about 1 to 5 seconds, it is possible to prevent aggregation of the moisture powders. The particle size of the obtained granulated component can be, for example, 50 μm or more (for example, 100 μm to 300 μm).

In the gas-phase-controlled moisture powder disclosed here, a solid phase, a liquid phase, and a gas phase form a pendular state or a funicular state (preferably, the funicular I state), and the solvent content is low to the extent that no solvent layer is observed on the outer surface of the agglomerated particles in electron microscope observation (for example, the solvent proportion may be about 2 to 15% or 3 to 8%), and conversely, the gas phase part is relatively large.

In order to obtain such an existence form, in the above preparing step S1, various treatments and operations that can increase the gas phase can be incorporated. For example, during stirring granulation or after granulation, the granulated component may be exposed to a dry gas (air or inert gas) atmosphere heated to a temperature about 10 to 50 degrees higher than room temperature, and thus an excess solvent may be evaporated. In addition, in order to promote formation of agglomerated particles in the pendular state or funicular I state when the amount of the solvent is small, compressive granulation with a relatively strong compressive action may be used in order to adhere the active material particles and other solid components to each other. For example, a compressive granulation machine in which granulation is performed when a compressive force is applied between rollers while a powder raw material is supplied between a pair of rollers in a vertical direction may be used.

Film Forming Step

In the production method disclosed here, the coating film 32 is formed while leaving the gas phase (void) of the electrode material 30. Formation of the coating film 32 composed of the electrode material 30 can be performed in, for example, the film forming part 120 schematically shown in FIG. 9. As shown, the film forming part 120 includes a plurality of continuous transfer rollers. In this example, it includes a first transfer roller 122 that faces a supply roller 121, a second transfer roller 123 that faces the first transfer roller, and a third transfer roller 124 that faces the second transfer roller and also faces a backup roller 125.

With such a configuration, the sizes of gaps G1 to G4 between rollers can be made different, and an appropriate coating film can be formed while maintaining communication holes for the moisture powder. This will be described below in detail.

In the film forming part 120, the outer circumferential surface of the supply roller 121 and the outer circumferential surface of the first transfer roller 122 face each other, and this pair of the supply roller 121 and the first transfer roller 122 rotate in directions opposite to each other as indicated by the arrows as shown in FIG. 9. In addition, the supply roller 121 and the first transfer roller 122 have a gap G1 with a predetermined width (thickness) according to a desired thickness of the coating film 32 formed on the electrode current collector 12, and it is possible to control the thickness of the coating film 32 composed of the electrode material 30 to be adhered to the surface of the first transfer roller 122 according to the size of the gap G1. In addition, by adjusting the size of the gap G1, it is possible to adjust a force with which the electrode material 30 that passes between the supply roller 121 and the first transfer roller 122 is compressed. Therefore, by making the gap size relatively large, it is possible to form a film when the gas phase of the electrode material 30 (specifically, each agglomerated particle) is maintained.

For the electrode material 30 compressed by the supply roller 121 and the first transfer roller 122, the second transfer roller 123 and the third transfer roller 124 form a film while adjusting the gas phase state of the electrode material 30. The second transfer roller 123 and the third transfer roller 124 rotate in directions opposite to each other as indicated by the arrows shown in FIG. 9. In addition, the second gap G2 is provided between the first transfer roller 122 and the second transfer roller 123, the third gap G3 is provided between the second transfer roller 123 and the third transfer roller 124, and when the gaps G2 and G3 are adjusted, the coating film 32 having a desired thickness and in a gas phase state can be produced.

The backup roller 125 has a function of transporting the electrode current collector 12 to the third transfer roller 124. The third transfer roller 124 and the backup roller 125 rotate in directions opposite to each other as indicated by the arrows shown in FIG. 9. In addition, the fourth gap G4 with a predetermined width (thickness) is provided between the third transfer roller 124 and the backup roller 125, and it is possible to control the thickness of the coating film 32 formed on the electrode current collector 12 depending on the size of the gap G4.

Since the supply roller 121, the first transfer roller 122, the second transfer roller 123, the third transfer roller 124 and the backup roller 125 are connected to independent driving devices (motors) (not shown), they can be rotated at different rotational speeds. Specifically, the rotational speed of the first transfer roller 122 is higher than the rotational speed of the supply roller 121, the rotational speed of the second transfer roller 123 is higher than the rotational speed of the first transfer roller 122, the rotational speed of the third transfer roller 124 is higher than the rotational speed of the second transfer roller 123, and the rotational speed of the backup roller 125 is higher than the rotational speed of the third transfer roller 124.

In this manner, when the rotational speed between rotary rollers is gradually increased in the current collector transport direction (traveling direction), it is possible to perform roll film formation.

The sizes of the gaps are set so that the first gap G1 is relatively a maximum, and the second gap G2, the third gap G3, and the fourth gap G4 are gradually reduced in this order (G1>G2>G3>G4). Since the gaps G1 to G4 are set so that the gaps gradually decrease in the transport direction (traveling direction) of the electrode current collector 12, film formation can be performed while adjusting the gas phase (void) state of the coating film 32. Although not particularly limited, the sizes (widths) of the gaps G1 to G4 may be set to be gap sizes so that the average film thickness of the coating film 32 is 10 μm or more and 300 μm or less (for example, 20 μm or more and 150 μm or less).

A partition wall (not shown) may be provided at both ends of the supply roller 121 and the first transfer roller 122 in the width direction. The partition wall holds the electrode material 30 on the supply roller 121 and the first transfer roller 122 and can define the width of the coating film 32 formed on the electrode current collector 12 by a distance between the two partition walls. The electrode material 30 is supplied between the two partition walls by a feeder (not shown) or the like.

The sizes of the supply roller 121, the first transfer roller 122, the second transfer roller 123, the third transfer roller 124 and the backup roller 125 are not particularly limited, and may be the same as those of the conventional film formation device, and for example, the diameters may be 50 mm to 500 mm. The diameters of the supply roller 121, the first to third transfer rollers 122, 123, and 124 and the backup roller 125 may be the same or different. In addition, the width of the coating film 32 formed may be the same as that of the conventional film formation device, and can be appropriately determined according to the width of the electrode current collector 12 on which the coating film 32 will be formed.

The materials of the outer circumferential surfaces of the supply roller 121, the first transfer roller 122, the second transfer roller 123, the third transfer roller 124 and the backup roller 125 may be the same as the material of the rotary roller in the conventional known film formation device, and examples thereof include SUS steel and SUJ steel. In order to prevent generation of metallic foreign substances, the materials of the outer circumferential surfaces of the supply roller 121 and the first to third transfer rollers 122, 123, and 124 that are in direct contact with the electrode material 30 are more preferably, for example, a ceramic such as zirconia, alumina, chromium nitride, aluminum nitride, titania, or chromium oxide.

Here, as an example, FIG. 10A to FIG. 10D show arrangement of the supply roller 121, the first transfer roller 122, the second transfer roller 123, the third transfer roller 124 and the backup roller 125, but the arrangement of these rollers is not limited thereto.

First Groove Forming Step

Formation of the first groove 16 extending in a direction orthogonal to the transport direction on the coating film 32 can be performed, for example, using a first concavo-convex transfer roller 132A and a backup roller 132B as shown in FIG. 9. The first concavo-convex transfer roller 132A has a convex part extending parallel to the rotating shaft along the outer circumferential surface.

In the method of producing an electrode disclosed here, the first groove forming step S3 is performed on the coating film 32 formed while leaving voids (gas phase). The average porosity (gas phase rate) of the coating film 32 preferably at least 1% or more, and may be, for example, 1% or more 55% or less, typically 5% or more 55% or less. If the first groove 16 is formed when the gas phase remains, since the spreadability is improved, a desired groove can be imparted to the coating film 32 with a load smaller than in the related art. In addition, even if a load is applied to form the first groove 16, the first groove 16 can be formed on the surface part of the coating film 32 without locally increasing the density (densification).

Here, in this specification, the "average porosity (gas phase rate) of the coating film" can be calculated by, for example, observing the cross section of the electrode active material layer using an electron microscope (SEM). The cross-section image is subjected to binarization processing so that the solid phase or liquid phase part turns white and the gas phase (void) part turns black using image analysis software "ImageJ" which is an open source and well-known as public domain image processing software. Thereby, "S2/(S1+S2)×100" can be calculated where an area of a part (white part) in which a solid phase or a liquid phase is present is called S1, and an area of avoid part (black part) is called S2. This is defined as a porosity of the coating film before drying. A plurality of cross-sectional SEM images are acquired (for example, 5 or more images), and the average value of the porosities is defined as an "average porosity (gas phase rate) of the coating film" before drying. Here, the "average porosity (gas phase rate) of the coating film" does not include a concave part (that is, macro voids) formed in the process of forming concavities/convexities.

The first concavo-convex transfer roller 132A has a convex part extending parallel to the rotating shaft for forming a predetermined pattern on the surface of the coating film 32. The backup roller 132B is a roller for feeding the transported electrode current collector 12 in the transport direction while supporting it. The first concavo-convex transfer roller 132A and the backup roller 132B are disposed at opposite positions. When the coating film 32 on the electrode current collector 12 passes through the gap between the first concavo-convex transfer roller 132A and the backup roller 132B, the convex part of the first concavo-convex transfer roller 132A is transferred to the surface of the coating film 32, and thus the first groove 16 can be formed on the surface of the coating film 32. The linear pressure of the first concavo-convex transfer roller 132A is not particularly limited because it may vary depending on the groove depth of a desired shape and the like, but can be set to about 15 N/cm to 75 N/cm, for example, about 25 N/cm to 65 N/cm.

The first groove 16 is required to be a continuous groove from one end to the other end of the electrode current collector 12 in the width direction. That is, the first groove 16 is required not to be a discontinuous groove from one end to the other end due to generation of foreign substances or poor groove formation. The groove continuous from one end to the other end of the electrode current collector 12 in the width direction above can be realized by the method of producing an electrode disclosed here.

The first grooves 16 may be formed with certain pitches or may be formed with different pitches. Preferably, when the wound electrode body 20 is constructed, at least one first groove 16 is preferably formed in the flat part 24. Although it is not particularly limited because it varies depending on the circumference of the wound electrode body 20 to be constructed and the like, when the first grooves 16 are formed with a certain pitch, the pitch is preferably 10 μm or more and 5 mm or less, more preferably 50 μm or more and 4 mm or less, and still more preferably 100 μm or more and 3 mm or less. When the first grooves 16 are formed with different pitches, the pitch may be adjusted so that more first grooves 16 are formed in a region corresponding to the winding start side of the wound electrode body 20.

Second Groove Forming Step

In the second groove forming step S4, the second groove 18 extending in the transport direction is formed on the coating film 32 in which the first groove 16 is provided in the first groove forming step S3. For example, formation of the second groove 18 can be performed using a second concavo-convex transfer roller 134A and a backup roller 134B as shown. The second concavo-convex transfer roller 134A has a convex part perpendicular to the rotating shaft along the outer circumferential surface. The linear pressure of the second concavo-convex transfer roller 134A is not particularly limited because it may vary depending on the groove depth of a desired shape and the like, but can be set to about 15 N/cm to 75 N/cm, for example, about 25 N/cm to 65 N/cm.

At least one second groove 18 may be formed, or a plurality of second grooves 18 may be formed. When a plurality of second grooves 18 are formed, they may be formed with certain intervals (pitch) or may be formed with different intervals (pitch). When second grooves are formed with a certain pitch, the pitch is 500 μm or more, and more preferably 1 mm or more.

When grooves are formed by the method of producing an electrode disclosed here, it is possible to realize formation of continuous grooves from one end to the other end without densifying the grooves. Although not particularly limited, the reason for this is thought to be as follows.

In the prior art, grooves are formed by pressing the dried coating film (electrode active material layer) using a mold having a convex part as described above. Alternatively grooves are formed by laser processing or scraping the surface of the electrode active material layer with a rotary cutter. Depending on formation of grooves by laser processing, when it is desired to form a continuous groove from one end to the other end, it is very difficult to control a part in which the film thickness of the coating film becomes thin (typically, an end of the current collector in the width direction), and there is a risk of the current collector being penetrated. When grooves are formed with a rotary cutter, since a relatively large load is applied to the active material layer when the hardness after drying increases and scraping is performed, cracks or breakage may occur in the electrode and it is difficult to form grooves having a desired size.

That is, in the grooves formed by the method in the related art, the bottom of the groove and the region in the vicinity of the groove are densified, and the groove becomes discontinuous due to foreign substances generated when the surface of the electrode active material layer is processed.

On the other hand, in the method of producing an electrode disclosed here, the first groove and second groove forming steps are performed on the coating film 32 composed of the moisture powder (gas-phase-controlled moisture powder) in the pendular state or funicular state (preferably, the funicular I state) described above. As shown in FIG. 10A and FIG. 10B, in the coating film 32, there are many gas phases 4, and the gas phase 4 forms a communication hole in the coating film 32. In addition, unlike the capillary state of FIG. 10C in which the active material particles 2 are crosslinked to each other by the solvent 3, the entire active material particle 2 is not covered with the solvent 3. Therefore, in the first groove and second groove forming steps, even if a pressure is applied to the coating film 32, the gas phase 4 is unlikely to be isolated, and the resistance between the active material particle 2 and the solvent 3 is low, and thus the active material particle 2 can easily move. As a result, the coating film 32 composed of the gas-phase-controlled moisture powder has excellent spreadability.

As described above, when the groove forming step (first groove forming step S3 and second groove forming step S4) is performed on the coating film 32 having excellent spreadability before the drying step S5, a desired groove can be formed with a relatively small load. Further, the groove formed according to the first groove forming step S3 disclosed here has the density increases to some extent, but is formed while leaving a communication hole, and a continuous groove from one end to the other end is formed.

Thereby, an electrode having the first groove 16 and the second groove 18 has excellent impregnation characteristics of the electrolyte solution.

The first groove and second groove forming steps can be performed so that the surface area of the coating film 32 increases. In particular, in the coating film 32 formed using the gas-phase-controlled moisture powder, it is possible to realize an average surface area of $1.05 \times L \times B$ cm² or more (preferably, $1.1 \times L \times B$ cm² or more), obtained by measuring a surface area in a reference area indicated by L cm×B cm (L and B are an integer of 3 or more) in the coating film at n (n is an integer of 5 or more) different points.

In addition, the coating film processing part 130 may further include a mechanism for adjusting the film thickness and the gas phase state of the coating film 32 using a pressing roller 136A and a backup roller 136B. The pressing roller 136A is a roller for pressing and compressing the coating film 32 in the film thickness direction, and the backup roller 136B is a roller for feeding the transported electrode current collector 12 in the transport direction while supporting it. The pressing roller 136A and the backup roller 136B are disposed at opposite positions. For example, the coating film 32 formed (film-formed) on the transported electrode current collector 12 can be pressed and compressed to the extent that no isolated voids are generated. Thereby, the gas phase state of the coating film 32 can be adjusted so that concavities/convexities are more suitably formed. An appropriate pressing pressure of the pressing roller 136A and the backup roller 136B is not particularly limited because it may vary depending on the film thickness and density of a desired coating film (electrode active material layer), and can be set to, for example, 0.01 MPa to 100 MPa, for example, about 0.1 MPa to 70 MPa.

Drying Step

As shown in FIG. 9, a drying furnace 142 including a heating device (heater) (not shown) as the drying part 140 is disposed downstream from the coating film processing part 130 of the electrode production device 100 according to the present embodiment in the transport direction. In the drying part 140, the coating film 32 formed on the electrode current collector 12 is dried to form an electrode active material layer. The drying method is not particularly limited, and examples thereof include hot air drying and infrared drying.

The drying temperature (temperature in the drying furnace) in the drying step S4 is not particularly limited because it varies depending on the type of a solvent used, a solid component proportion (a proportion of the solid component in the electrode material) of the coating film 32 and the like, and is, for example, set to 80° C. or higher, typically 100° C. or higher, and preferably 120° C. or higher. The upper limit of the drying temperature is not particularly limited, and in order to prevent oxidation of the electrode current collector 12, is set to, for example, 200° C. or lower, typically 190° C. or lower, and preferably 180° C. or lower.

In order to improve the productivity, the transport speed in the drying step S5 is, for example, preferably set to 1 m/min or more, and more preferably set to 3 m/min or more. If the transport speed is too high, since the coating film 32 is likely to crack, in this regard, the transport speed may be set to 15 m/min or less, 10 m/min or less, or 8 m/min or less.

Generally, when a coating film composed of a conventional slurry-like electrode material is dried at a relatively high temperature (for example, 100° C. or higher) or a relatively high transport speed (for example, 8 m/min or more), "migration" occurs, which is a phenomenon in which a binder having a small specific gravity segregates on the surface side. When such "migration" occurs, the adhesion between the electrode current collector 12 and the electrode active material layer 14 decreases, and during the producing step or during repeated charging/discharging, the electrode active material layer 14 is easily separated from the electrode current collector 12. On the other hand, in the method of producing an electrode disclosed here, in particular, when the electrode active material layer produced using the gas-phase-controlled moisture powder is uniformly divided into two layers, an upper layer and a lower layer, in the thickness direction from the surface of the active material layer to the electrode current collector, and the concentrations (mg/L) of binder resins of the upper layer and the lower layer are C1 and C2, they have a relationship of $0.8 \leq (C1/C2) \leq 1.2$. That is, the electrode active material layer 14 may be an electrode active material layer 14 in which binder segregation (migration) is unlikely to occur between the upper layer and the lower layer.

When the gas-phase-controlled moisture powder is used as the electrode material 30, the solid component proportion can be largely increased as compared with the coating film composed of a slurry-like electrode material. Thereby, even if the time of the drying step S5 is shortened (for example, the temperature in the drying furnace is set high or the transport speed in the drying step S5 is set high), the occurrence of "migration" can be minimized. Therefore, according to the method of producing an electrode disclosed here, it is possible to produce a (high-quality) electrode for a secondary battery having improved durability without impairing productivity.

Pressing Step

After the drying step S5, the pressing step S6 is performed in order to adjust the basis weight and the electrode density of the electrode active material layer 14 in the pressing part 150. The pressing step S6 can be performed according to a conventionally known method using a roll rolling mill or a flat plate rolling mill as a pressing device 152.

In the pressing performed here, pressing is performed so that the grooves formed in the first groove forming step S3 and the second groove forming step S4 remain. The pressing pressure is not particularly limited because it varies depending on the film thickness of the coating film 32 to be formed and the groove depth of the first groove 16 and the second groove 18, and for example, in roll pressing by a roll rolling mill, the linear pressure is preferably set to about 1 ton/cm to 5 ton/cm. In the case of pressing by a flat plate rolling mill, the pressing pressure is preferably set to, for example, about 100 to 500 MPa. By adjusting to such a pressing pressure, it is possible to suitably produce the electrode 10 having a groove for improving the impregnation characteristics of the electrolyte solution.

Thereby, a long sheet-shaped electrode for a secondary battery is produced. The long sheet-shaped electrode produced in this manner can be used for constructing the non-aqueous electrolyte secondary battery disclosed here.

The electrode 10 produced as described above and the lithium ion secondary battery 200 using the electrode 10 can be used for various applications. Examples of appropriate applications include drive power supplies mounted in vehicles such as battery electric vehicles (BEV), hybrid electric vehicles (HEV), and plug-in hybrid electric vehicles (PHEV). The lithium ion secondary battery 200 can be used in the form of an assembled battery in which a plurality of batteries are connected in series and/or parallel.

While examples related to the method of producing an electrode disclosed here will be described below, the technology disclosed here is not intended to be limited to what is shown in the examples.

Example 1

A gas-phase-controlled moisture powder that can be suitably used as a positive electrode material was produced, and a positive electrode active material layer was then formed on a copper foil using the produced moisture powder (positive electrode material).

In this test example, a lithium transition metal oxide ($LiNi_{1/3}Co_{1/3}Mn_{1/3}O_2$) having an average particle size ($D_{50}$) of 20 μm based on a laser diffraction/scattering method was used as a positive electrode active material, polyvinylidene fluoride (PVDF) was used as a binder resin, acetylene black was used as a conductive material, and NMP was used as a non-aqueous solvent.

First, solid components including 90 parts by mass of the positive electrode active material, 2 parts by mass of PVDF and 8 parts by mass of acetylene black were put into a stirring granulation machine (a planetary mixer or a high speed mixer), and mixed and stirred.

Specifically, in the stirring granulation machine having a mixing blade, the rotational speed of the mixing blade was set to 4,500 rpm, a stirring and dispersion treatment was performed for 15 seconds, and thereby a powder material mixture composed of the solid components was obtained. NMP as the solvent was added to the obtained mixture so that the solid component proportion was 90 wt %, stirring granulation compositing was performed at a rotational speed of 300 rpm for 30 seconds, stirring was then performed at a rotational speed of 4,500 rpm for 2 seconds, and refining was performed. Thereby, a moisture powder (positive electrode material) according to this test example was produced.

Then, the obtained gas-phase-controlled moisture powder (positive electrode material) was supplied to the film forming part of the electrode production device, and a coating film was formed on the surface of a positive electrode current collector composed of an aluminum foil prepared separately so that the average film thickness was 100 μm.

The coating film was transported to a coating film processing part, concavo-convex transfer was performed with a concavo-convex transfer roller, and a plurality of first grooves and a second groove orthogonal to the first groove were formed. The first grooves were formed with a groove depth of 80 μm and a pitch of 2.5 mm. One second groove was formed with a groove depth of 50 μm. The coating film was dried in the drying part, and an electrode having an electrode (positive electrode) active material layer on the aluminum foil was obtained.

Comparative Example 1

As a comparison target, an electrode having no grooves formed was prepared. Specifically, electrode materials were mixed in the same manner as in Example 1, and a coating film was formed on the surface of a positive electrode current collector composed of an aluminum foil prepared separately. The coating film was dried in the drying part, and an electrode having an electrode (positive electrode) active material layer on the aluminum foil was obtained.

Comparative Example 2

As a comparison target, in a dried and pressed electrode, first grooves and second grooves were formed with a rotary cutter so that the sizes of the grooves were the same as those in Example 1. Specifically, electrode materials were mixed in the same manner as in Example 1, and a coating film was formed on the surface of a positive electrode current collector composed of an aluminum foil prepared separately. The coating film was dried in the drying part, and an electrode having an electrode (positive electrode) active material layer on the aluminum foil was obtained. A plurality of first grooves and a second groove orthogonal to the first grooves were formed on the surface of the electrode with a rotary cutter. Here, the groove depth and pitch were set to be the same as those in Example 1.

The surfaces of the electrodes of Example 1 and Comparative Example 2 were observed under a scanning electron microscope (SEM). The groove of Example 1 was formed as a continuous groove from one end to the other end. On the other hand, the groove of Comparative Example 2 was a discontinuous groove in which foreign substances remained at a plurality of parts of the groove.

The impregnation characteristics of the electrolyte solution were tested in Example 1 and Comparative Examples 1 and 2. Specifically, a sample in which the electrode of each example was interposed between two preparations in the thickness direction and both ends of the current collector in the longitudinal direction were constrained was prepared. Under an environment of 25° C., a part of the unconstrained part (on the lower side in the width direction) of the preparation of each example was immersed in a non-aqueous electrolyte solution, and the state in which the non-aqueous electrolyte solution permeated was observed. Here, regarding the non-aqueous electrolyte solution, a solution in which $LiPF_6$ as a supporting salt at a concentration of 1.0 mol/L was dissolved in a mixed solvent containing ethylene carbonate (EC), dimethyl carbonate (DMC), and ethyl methyl carbonate (EMC) at a volume ratio of 1:1:1 was used.

The time for the non-aqueous electrolyte solution to impregnate into the entire electrode was 1 minute and 30 seconds in Example 1, 40 minutes in Comparative Example 1, and 22 minutes in Comparative Example 2. In Example 1, in the step 10 seconds after the immersion, the non-aqueous electrolyte solution was injected into the entire groove, and the state in which the non-aqueous electrolyte solution was completely impregnated through the groove was observed. It was found that, while the groove was formed in Comparative Example 2, the impregnation time of the non-aqueous electrolyte solution was very long compared to Example 1. This is thought to have been caused by the fact that the effect of the injection path was weak because foreign substances were generated in a plurality of parts of the groove of Comparative Example 2 and the groove was discontinuous. Further, this is thought to have been caused by the fact that it was difficult for the non-aqueous electrolyte solution to impregnate through the groove because the groove was densified.

That is, it can be said that the electrode in which a surface part of an electrode active material layer has a plurality of first grooves extending in a width direction of a current collector and at least one second groove extending in a longitudinal direction, the first groove is formed so that it is continuous from one end to the other end, a region in which the first groove and the second groove are formed is uniformly divided into three layers, an upper layer, an intermediate layer and a lower layer in a thickness direction from the surface of the electrode active material layer to the electrode current collector, and when electrode densities (g/cm$^3$) of the upper layer, the intermediate layer and the lower layer of the groove are $d_1$, $d_2$, and $d_3$, respectively, they have a relationship of $0.8<(d_1/d_3)<1.1$ is an electrode having a preferably improved impregnation characteristics.

While specific examples of the present disclosure have been described above in detail, these are only examples, and do not limit the scope of the claims. The technologies described in the claims include various modifications and alternations of the specific examples exemplified above.

What is claimed is:

1. An electrode for a secondary battery which is any electrode of positive and negative electrodes of a non-aqueous electrolyte solution secondary battery, the electrode comprising:
    a long sheet-shaped electrode current collector; and
    an electrode active material layer formed on the electrode current collector, wherein
        a surface part of the electrode active material layer has a plurality of first grooves extending in a width direction of the electrode current collector and at least one second groove extending in a longitudinal direction of the electrode current collector;
        each of the first grooves is formed to be continuous from one end to another end;
        a region in which the first grooves and the at least one second groove are formed is uniformly divided into three layers, which are an upper layer, an intermediate layer and a lower layer, in a thickness direction from the surface part of the electrode active material layer to the electrode current collector; and
        electrode densities (g/cm$^3$) of the upper layer, the intermediate layer and the lower layer of the region in which the first grooves and the at least one second groove are formed are $d_1$, $d_2$, and $d_3$, respectively, and a relationship of $0.8<(d_1/d_3)<1.1$ is satisfied.

2. The electrode for a secondary battery according to claim 1,
    wherein the at least one second groove is formed in plurality in the longitudinal direction of the electrode current collector.

3. A non-aqueous electrolyte solution secondary battery comprising a flat wound electrode body in which a positive electrode having a positive electrode active material layer on a long sheet-shaped positive electrode current collector, a negative electrode having a negative electrode active material layer on a long sheet-shaped negative electrode current collector, and a separator are wound around a winding axis, and a non-aqueous electrolyte solution,
    wherein the electrode according to claim 1 is used as at least one of the positive electrode and the negative electrode.

* * * * *